3,578,396
FLUIDIZED BED TREATMENT OF SPENT PULP
DIGESTION LIQUOR
Robert J. Priestley, Westport, Conn., assignor to
Dorr-Oliver Incorporated, Stamford, Conn.
Filed Aug. 13, 1968, Ser. No. 752,334
Int. Cl. D21c 11/12
U.S. Cl. 23—48                                    7 Claims

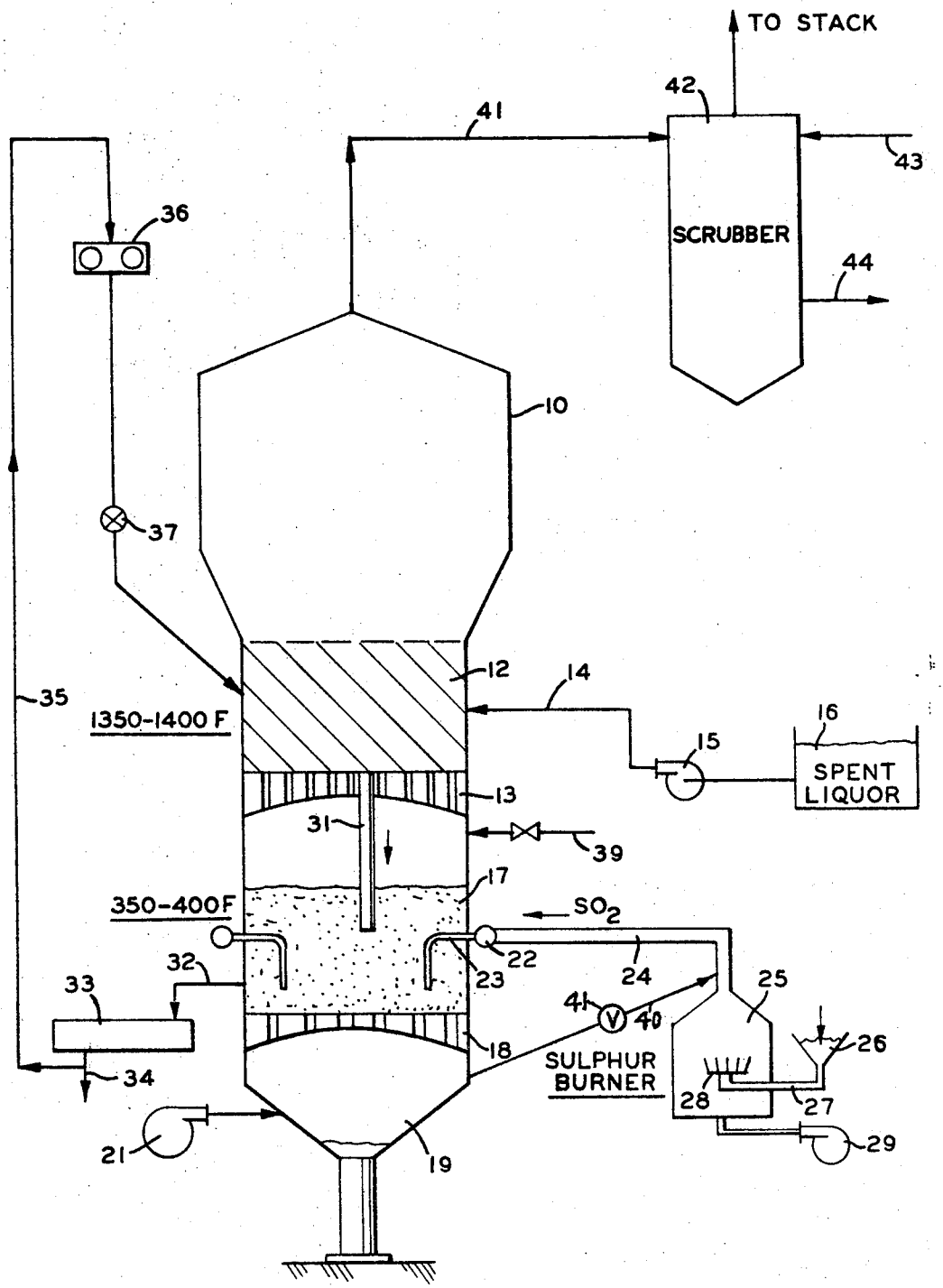

ABSTRACT OF THE DISCLOSURE

The reclaiming of chemicals from spent wood pulp digestion liquors by reacting the liquor in a thermal oxidizing, fluidized bed, then feeding the product to a fluidized cooling bed, $SO_2$ from a sulfur burner being fed directly into the cooling bed and thence to the oxidizing bed to form additional sulphate material, without formation of objectionable $SO_3$ and scale formation which tends to result from introducing hot $SO_2$ into the hot bed.

---

This invention relates to the treatment of spent sodium or other alkaline metal sulfite or sulphate liquors coming from the chemical digestion of wood pulp in order to reclaim the chemical for reuse or sale.

One method now employed for this purpose is to concentrate the spent liquors from sodium sulfite digestion and feed them into a hot fluidized bed or granular material to oxidize and pelletize the chemicals in the spent liquor thus making them suitable for sale or reuse. To convert the carbonates to sulfates, sulfur is fed, in the form of $SO_2$ from a sulfur burner, into the fluidized bed. In a preferred type of apparatus for carrying out this process, there is provided below the thermal oxidizing bed a cooling bed to receive the product from the oxidizing bed and cool the same.

It has been found that in feeding $SO_2$ gas into the oxidizing bed the $SO_2$ tends to oxidize to $SO_3$ at the temperature, approximately 1000–1200° F., at which the $SO_2$ comes from the sulfur burner. This $SO_3$ is believed to combine with some of the carbonate dust from the cooling compartment, to form sodium acid sulfate. This is a sticky material which tends to form scale on the reactor parts and particularly on tuyeres or nozzles of the constriction plate through which the fluidized gas passes. I have found that if we feed the $SO_2$ into the cooling bed below the surface thereof, I can quench the $SO_2$ gas to below the temperature at which $SO_3$ forms. This in turn prevents scaling of the constriction plate.

In the drawings, the figure shown is a diagrammatic flow sheet of the process of the present invention as applied to the reclaiming of spent liquors.

In the figure, there is shown a fluidized bed reactor 10 having a hot fluidized bed 12 of granular material operating at between 1200 and 1400° F., and preferably at about 1350° F., supported on a constriction plate 13. This bed is supplied with concentrated spent sulfite pulp digestion liquor through conduit 14 by pump 15 from liquor tank 16.

In the fluidized bed reactor, a cooling fluidized bed 17 on a constriction plate 18 below which a windbox 19 is located supplied with air under pressure from blower 21 which supplies cooling air through the cooling bed 17 and oxidizing air through the hot bed 12 under sufficient pressure to fluidize the material in both cooling bed and the hot bed.

In order to increase the production of sulfates resulting from the oxidizing reaction of the liquor, which is commonly deficient in sulfur for this purpose, $SO_2$ is introduced into the oxidizing bed. In order to cool the $SO_2$ before this, the $SO_2$ is first fed to the cooling bed 17 through a bustle pipe 22 surrounding the reactor walls and having a plurality of nozzles 23 entering directly into the bed substantially below the upper surface of the bed. $SO_2$ is supplied to bustle pipe 22 through conduit 24 from an $SO_2$ burner 28 supplied with elemental sulfur from a hoper 26 delivering through conduit 27. Air is supplied to the burner by blower 29. The $SO_2$ resulting has a temperature of approximately 1200 or more degrees F. This gas is quickly quenched as it passes into the cooling bed 17 which operates at a temperature between 150 and 500° F. and preferably at about 235° F. The $SO_2$ may also be cooled by sending some of the fluidizing air through conduit 40 and valve 41 into the $SO_2$ gas in conduit 24. As a result the $SO_2$ passing from the cooling bed into the hot oxidizing bed along with the fluidizing air contains little or none of the scale producing $SO_3$.

It is believed that by cooling the $SO_2$ as above described (1) the $SO_2$ is rapidly cooled preventing the formation of $SO_3$ and (2) the acid mist that is formed or present in the $SO_2$ gas stream reacts with the sodium carbonate of the product pellets in the cooling bed to produce some additional sodium sulfate, and to eliminate the acid mist through absorption by the cool pellets. At any rate the depositing of the sticky, low melting point, sodium acid sulfate on the constriction plate and the tuyeres or nozzles commonly used at the openings of the constriction plate, tending to produce severe scaling, is eliminated. In actual practice, feeding the $SO_2$ into the cooling bed has been found to overcome the scaling difficulties referred to and minimize any $SO_3$ formation.

Transfer of the reacted material from the hot bed is made through transfer pipe 31 to the cool bed 17. The completed and cooled product issues through conduit 32 to receiver 33 from which the completed product is delivered at 34. A part of the completed product is returned through conduit 35 and product crusher 36 supply to which is controlled by valve 37. The crushed product is supplied as seed for pelletizing the material being reacted in the hot fluidized bed which builds up on the seed material into pellets as the result of the adhesive qualities of some of the material in the liquor such as sodium compounds. While operation is normally autogenous, for starting purposes, or in cases where the liquor has insufficient fuel value for autogenous oxidation, a burner 39 is provided for heating the air above the cooling bed and below the constriction plate 13.

Thus applicant, in a simple and effective manner, has greatly improved the operation of fluidized bed treatment of spent pulp digestion liquor by decreasing or eliminating the formation of $SO_3$ with its objectionable characteristics and scale formation.

While a preferred embodiment of the invention is described, other modifications may be made without departing from the scope of the invention as defined by the attendant claims. For example, the $SO_2$ may enter the cooling bed 17 through a conduit extending downwardly through the upper surface of the bed or may enter the constriction plate 18 as well as through the sidewall of the reactor as shown.

It is understood that the accompanying drawings and description are used in an illustrative and not in a limiting sense, and that the scope of the invention is to be determined from the accompanying claims.

I claim:
1. The method of treating concentrated spent alkaline metal base liquor from wood pulp digestion, to produce alkaline metal sulfates as a reaction product, which comprises
providing a reactor having a constriction plate supporting a bed of hot fluidized granular material resulting from the reaction of said liquor with a fluidizing gas, feeding said liquor to said hot bed to form said granular material as the reaction product, by reaction with said fluidizing gas, maintaining a cooling bed of said granular reaction product in a fluidized state, supplying fluidizing air sequentially through said cooling bed and through said hot bed, effective to maintain said hot bed of granular material in a fluidized state at oxidizing temperatures, burning sulfur to provide $SO_2$, feeding said $SO_2$ directly into said fluidized cooling bed, to be discharged below the upper surface thereof, whereby the temperature of the $SO_2$ is lowered rapidly to a point at which any reaction thereof with entrained carbonate dust in and above said cooling bed produces sulfate particles that are non-scale forming, whereby plugging of said constriction plate is avoided, allowing said $SO_2$ to rise together with the fluidizing air into said hot fluidized bed, to react with the sodium carbonate contained in said granular material, producing said alkaline metal sulfates as a reaction product, delivering the hot reaction product from said hot bed to said cooling bed, and delivering the cooled reaction product from said cooling bed.

2. The method defined in claim 1, which comprises feeding the $SO_2$ into the cooling fluidized bed between the upper and lower surfaces of the bed.

3. The method according to claim 1, which comprises operating said cooling bed at temperatures between 150° F. and 300° F.

4. The method according to claim 1, which comprises operating said hot bed at temperatures from 1200° F. to 1400° F.

5. The method defined in claim 1, which comprises operating said hot bed at temperatures from 1200° F. to 1600° F., and maintaining the cooling bed at temperatures between 150° F. and 300° F.

6. The method defined in claim 1, which comprises operating said hot bed at temperatures from 1200° F. to 1400° F., and maintaining the cooling bed at temperatures between 150° F. and 300° F.

7. The method defined in claim 1, which comprises mixing prior to the cooling bed at least part of the fluidizing air with $SO_2$ for at least partially cooling the same.

References Cited

UNITED STATES PATENTS

| | | | |
|---|---|---|---|
| 2,635,684 | 4/1953 | Joscelyne | 159—FB(UX) |
| 2,783,187 | 2/1957 | Odell | 159—FB(UX) |
| 3,006,804 | 10/1961 | De Vos et al. | 162—36 |
| 3,322,492 | 5/1967 | Flood | 162—30 |

OTHER REFERENCES

"Finding Money in Sulfite-Pulp Spent Liquor," Chemical Engineering, Aug. 16, 1965, pp. 74 and 76, vol. 72, No. 17.

S. LEON BASHORE, Primary Examiner

T. G. SCAVONE, Assistant Examiner

U.S. Cl. X.R.

23—121; 159—47; 162—30